United States Patent
Paulus et al.

(10) Patent No.: US 12,316,263 B2
(45) Date of Patent: May 27, 2025

(54) METHOD AND DEVICE FOR OPERATING AN ELECTRIC MACHINE

(71) Applicant: Robert Bosch GmbH, Stuttgart (DE)

(72) Inventors: Sebastian Paulus, Esslingen am Neckar (DE); Michele Hirsch, Esslingen (DE); Thomas Zeltwanger, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 18/257,388

(22) PCT Filed: Dec. 1, 2021

(86) PCT No.: PCT/EP2021/083746
§ 371 (c)(1),
(2) Date: Jun. 14, 2023

(87) PCT Pub. No.: WO2022/128471
PCT Pub. Date: Jun. 23, 2022

(65) Prior Publication Data
US 2024/0022203 A1    Jan. 18, 2024

(30) Foreign Application Priority Data
Dec. 16, 2020   (DE) .................. 10 2020 215 973.4

(51) Int. Cl.
*H02P 29/50*    (2016.01)
*H02P 27/08*    (2006.01)

(52) U.S. Cl.
CPC .............. *H02P 29/50* (2016.02); *H02P 27/08* (2013.01)

(58) Field of Classification Search
CPC .......... H02P 23/28; H02P 27/08; H02P 29/50; H02P 21/22; H02P 6/10; H02P 27/085; H02P 21/00; H02P 2209/09; H02P 27/04; H02P 6/14; H02P 25/022; H02P 25/03; H02P 25/098; H02P 27/06; H02P 21/14;
(Continued)

(56) References Cited

U.S. PATENT DOCUMENTS
2014/0265961 A1    9/2014   Gebregergis et al.

FOREIGN PATENT DOCUMENTS
CN   109347387 B      4/2020
DE   102011003352 A1  9/2011
EP   2713501 A2 *     4/2014 ............. H02P 21/00

OTHER PUBLICATIONS
"Yoshitaka Iwaji et al., PWM Control Method and Driving System of AC Motor, Apr. 2, 2014, Clarivate Analytics , pp. 1-54" (Year: 2014).*

(Continued)

*Primary Examiner* — Antony M Paul
(74) *Attorney, Agent, or Firm* — Michael Best & Friedrich LLP

(57) ABSTRACT

The invention relates to a method for operating an electric machine. A harmonic manipulated variable with respect to a harmonic of a predetermined frequency occurring during the energization of the electric machine is determined. The electric machine is energized using the determined harmonic manipulated variable by means of a pulse width modulation method. For each period of the pulse width modulation method, the harmonic manipulated variable is determined for both a switch-on operation and a switch-off operation.

10 Claims, 3 Drawing Sheets

(58) Field of Classification Search
CPC ..... H02P 21/50; H02P 23/14; H02K 2213/12; H03K 7/08
See application file for complete search history.

(56) References Cited

OTHER PUBLICATIONS

Translation of International Search Report for Application No. PCT/EP2021/083746 dated Feb. 16, 2022 (2 pages).
Pandit et al., "PR Controller Implementation using Double Update Mode Digital PWM for Grid Connected Inverter," IEEE International Conference on Power Electronics, Drives and Energy Systems (PEDES), 2014, 6 pages.

* cited by examiner

METHOD AND DEVICE FOR OPERATING AN ELECTRIC MACHINE

BACKGROUND

The present invention relates to a method of operating an electric machine and a device for operating an electric machine. The invention can in particular relate to a method and device for regulating the electric machine.

In order to reduce noises or torque ripples that interfere with the operation of an electric machine, what is referred to as "current harmonics" can be applied (also referred to as "current shaping" or "resonant control"). The harmonics (i.e., harmonic waves) in this case occur during operation of the electric machine.

For this purpose, at least one harmonic order (facHrmc) is applied in addition to the primary wave. For example, the sixth harmonics (+6 and −6) are often applied in the field-oriented coordinate system, i.e., facHrmc=6. In the phase coordinate system, said harmonics correspond to a −5th and +7th order. In general, the harmonic frequencies in field-oriented coordinates are given by:

Frq_dq_Harmonic_Neg=−facHrmc*Frq_Electrical=−6*Frq_Electrical,

Frq_dq_Harmonic_Pos=facHrmc*Frq_Electrical=6*Frq_Electrical.

Corresponding harmonic frequencies in phase coordinates are given by:

Frq_AlphaBeta_Harmonic_Neg=−(facHrmc−1)*Frq_Electrical=−5*Frq_Electrical,

Frq_AlphaBeta_Harmonic_Pos=(facHrmc+1)*Frq_Electrical=7*Frq_Electrical.

The harmonic currents can be adjusted using harmonic voltage regulation or harmonic current regulation.

One exemplary method for optimizing a third harmonic current injection in a multi-phase machine is known from DE 10 2011 003 352 A1.

In order to control an electric machine, three-phase or multi-phase target voltages (manipulated variables) are conventionally calculated for each period of a pulse width modulation method (PWM). Employed as modulation methods are three-phase or multi-phase sinusoidal PWM, space vector pulse width modulation (SVPWM) flat-top, or similar methods.

Pandit et al., "PR controller implementation using double update mode digital PWM for grid connected inverter", 2014, describes an extension of the PWM method by means of the "double update" function. The method is used to improve the dynamics when regulating transient variables having a PWM manipulated variable. Using the method, e.g., a lower delay to the set voltage is achieved, since the voltage can be set more often. The low delay enables the regulator to have higher dynamics.

In a normal pulse width modulation method (i.e., using "single update"), exactly one control signal is calculated for each period of the pulse width modulation method. Depending on the PWM variant (left, right or centered), this results in a switch-on time and a switch-off time for the switch-off operation.

SUMMARY

The present invention relates to a method and a device for operating an electric machine, a computer program product, and a non-volatile computer-readable memory medium.

According to a first aspect, the invention accordingly relates to a method for operating an electric machine. A harmonic manipulated variable is determined with respect to a harmonic of a predetermined frequency occurring during the energization of the electric machine. The electric machine is energized using the determined harmonic manipulated variable by means of a pulse width modulation method. For each period of the pulse width modulation method, the harmonic manipulated variable is determined for both a switch-on operation and a switch-off operation.

According to a second aspect, the invention accordingly relates to a device for regulating an electric machine. A computing means determines a harmonic manipulated variable with respect to a harmonic of a predetermined frequency occurring during the energization of the electric machine. A control means energizes the electric machine using the determined harmonic manipulated variable by means of a pulse width modulation method. The device is designed to determine the harmonic manipulated variable for both a switch-on operation and a switch-off operation for each period of the pulse width modulation method.

According to a third aspect, the invention accordingly relates to a computer program product having an executable program code designed to perform the method according to the invention for operating the electric machine when executed on a computer.

According to a fourth aspect, the invention accordingly relates to a non-volatile computer-readable memory medium having an executable program code designed to perform the method for operating the electric machine when executed on a computer.

According to the present invention, harmonics are injected, with a "double update" pulse width modulation method being employed. Accordingly, two harmonic manipulated variables or harmonic control signals are calculated for each period of the pulse width modulation method. A harmonic manipulated variable is calculated for the switching time of the switch-on operation, and a further harmonic manipulated variable is calculated for the switching time of the switch-off operation. Accordingly, the switch-on and switch-off times are determined independently of one another by means of two independently calculated harmonic manipulated variables. The modulation and the voltage position of the harmonic frequency can as a result be improved.

The determined harmonic manipulated variables therefore affect the respective switch-on and switch-off operations, i.e., they are applied when powering the electric machine.

The "double update" function for the pulse width modulation method is therefore specifically used for the harmonic frequency. The "double update" function not only reduces the delay between the calculated target voltage and the actual voltage, but also the maximum possible frequency of a target voltage able to be generated using the pulse width modulation method. The maximum speed and the maximum electrical frequency at which a harmonic voltage can be applied are thereby doubled.

The invention can thus be used for harmonic current regulation and for harmonic voltage regulation (i.e., no regulation) in order to enable higher harmonic frequencies for the harmonic voltages and currents.

A "harmonic manipulated variable" can be understood to mean a manipulated variable for a harmonic being supplied (e.g., the target voltage applied to the electric machine).

The fixed or variable frequency of the pulse width modulation method can be determined based on the hardware used, in particular semiconductors and microcontrollers of an inverter, efficiency requirements, component protection requirements, etc. By injecting harmonics with "single updates", the theoretical maximum frequency of the harmonic is limited to half the frequency of the pulse width modulation method according to the Nyquist theorem. In fact, even more scan points (facFrqModFrqPwm) are needed in order for a sinusoidal wave to set a stable harmonic voltage:

Frq_ModulationMax=FrqPWM/facFrqModFrqPwm.

The maximum electrical frequency at which the harmonic frequency can be adjusted is in this case given by:

Frq_electrical_HarmonicMax=Frq_ModulationMax/ (facHrmc+1)=

FrqPWM/(facFrqModFrqPwm*(facHrmc+1)).

For example, at a PWM frequency of 10 kHz and a required factor facFrqMod-FrqPwm=6, the maximum electrical frequency at which the seventh harmonic frequency is applied is given by:

Frq_electrical_HarmonicMax=10000/(6*7)=238.0952 Hz.

The speed range of the harmonic injection is in this case limited at a given PWM frequency. By using "double updates", the speed range can be extended despite a limited PWM frequency.

According to a further embodiment, the method for operating the electric machine relates to a method for regulating the electric machine. Accordingly, a harmonic feedback variable is determined, which comprises an actual variable for the harmonics occurring during the energization of the electric machine. A harmonic regulation deviation is also determined using the determined harmonic feedback variable and a predetermined reference variable with respect to the harmonic. The harmonic manipulated variable is determined using the determined harmonic regulation deviation. The invention is therefore usable for regulation methods.

According to a further embodiment of the method for operating the electric machine, the harmonic feedback variable comprises the actual variable for the harmonic in a field-oriented system. The harmonic feedback variable is thereby transformed into a harmonic equalizing feedback variable in a harmonic-oriented system. The harmonic regulation deviation is determined as a difference between the harmonic equalizing feedback variable and the predetermined reference variable. The method can therefore comprise an input transformation process.

According to a further embodiment of the method for operating the electric machine, in order to determine the harmonic manipulated variable using the determined harmonic regulation deviation, a harmonic equalization variable is determined in the harmonic-oriented system, in which case the harmonic correcting variable is reverse-transformed into the harmonic manipulated variable in the field-oriented system. The method can therefore comprise an output transformation process.

According to a further embodiment of the method for operating the electric machine, a primary wave manipulated variable is further determined by means of a primary wave regulation process, whereby a machine manipulated variable is determined by superimposing the primary wave manipulated variable on the harmonic manipulated variable, and whereby the electric machine is energized using the determined machine manipulated variable. The machine manipulated variable can in particular be a voltage. Within the time range, the machine manipulated variable can comprise an alternating variable, a primary wave, and at least one further superimposed alternating variable, i.e. a harmonic.

According to a further embodiment of the device for regulating the electric machine, the computing means is further designed to determine a harmonic feedback variable, which comprises an actual variable for the harmonics occurring during the energization of the electric machine. The computing means further determines a harmonic regulation deviation using the determined harmonic feedback variable and a predetermined reference variable with respect to the harmonic. The computing means determines the harmonic manipulated variable using the determined harmonic regulation deviation.

According to a further embodiment of the device for regulating the electric machine, the harmonic feedback variable comprises the actual variable of the harmonic in a field-oriented system. The computing means transforms the harmonic feedback variable into a harmonic equal feedback variable in a harmonic-oriented system and determines the harmonic regulation deviation as a difference between the harmonic equalizing feedback variable and the predetermined reference variable.

BRIEF DESCRIPTION OF THE DRAWINGS

Shown are.

Figure 1:
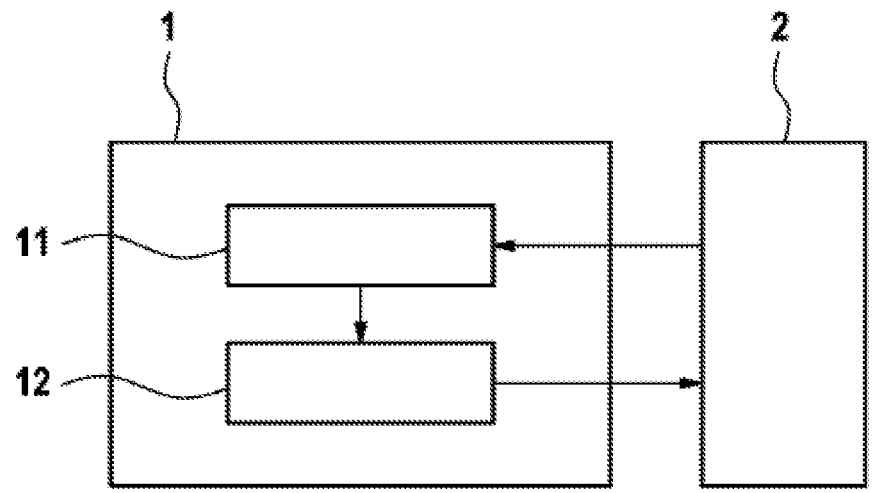
FIG. 1 a schematic block diagram of an electric machine and a device for operating the electric machine according to one embodiment of the invention.

In all drawings, identical or functionally identical elements and devices are provided with the same reference characters. The numbering of the method steps is used for reasons of clarity and is generally not intended to imply any particular temporal order. It is in particular also possible to perform multiple method steps simultaneously.

DETAILED DESCRIPTION

FIG. 1 shows a schematic block diagram of an electric machine 2 and a device 1 for operating the electric machine 2. The device 1 comprises a computing means 11, which determines a harmonic manipulated variable with respect to a harmonic of a predetermined frequency occurring during energization of the electric machine 2.

The control means 11 can in particular be a harmonic regulator. The computing means 11 can for this purpose determine a harmonic feedback variable, which comprises an actual variable for the harmonic occurring during energization of the electric machine 2. The computing means 11 further determines a harmonic regulation deviation using the determined harmonic feedback variable and a predetermined reference variable with respect to the harmonic. The computing means 11 determines the harmonic manipulated variable using the determined harmonic regulation deviation.

The harmonic feedback variable can comprise the actual variable for the harmonic in a field-oriented system. The computing means 11 transforms the harmonic feedback variable into a harmonic equalization feedback variable in a harmonic-oriented system and determines the harmonic regulation deviation as a difference between the harmonic equalizing feedback variable and the predetermined reference variable.

In order to determine the harmonic manipulated variable using the determined harmonic regulation deviation, the computing means 11 can determine a harmonic equalizing variable in the harmonic-oriented system, whereby the harmonic equalizing variable is reverse-transformed into the harmonic manipulated variable in the field-oriented system.

The computing means 11 can further determine a primary wave manipulated variable by means of a primary wave regulation process, whereby a machine manipulated variable is determined by superimposing the primary wave manipulated variable on the harmonic manipulated variable.

The device 1 further comprises a control means 12, which energizes the electric machine using the determined harmonic manipulated variable by means of a pulse width modulation method. The electric machine 2 can be energized using the determined machine manipulated variable. A "double update" function is used in the pulse width modulation method. In other words, for each period of the pulse width modulation method, the harmonic manipulated variable is calculated at least twice, i.e., for both a switch-on operation (rising flank) and a switch-off operation (falling flank).

Figure 2:
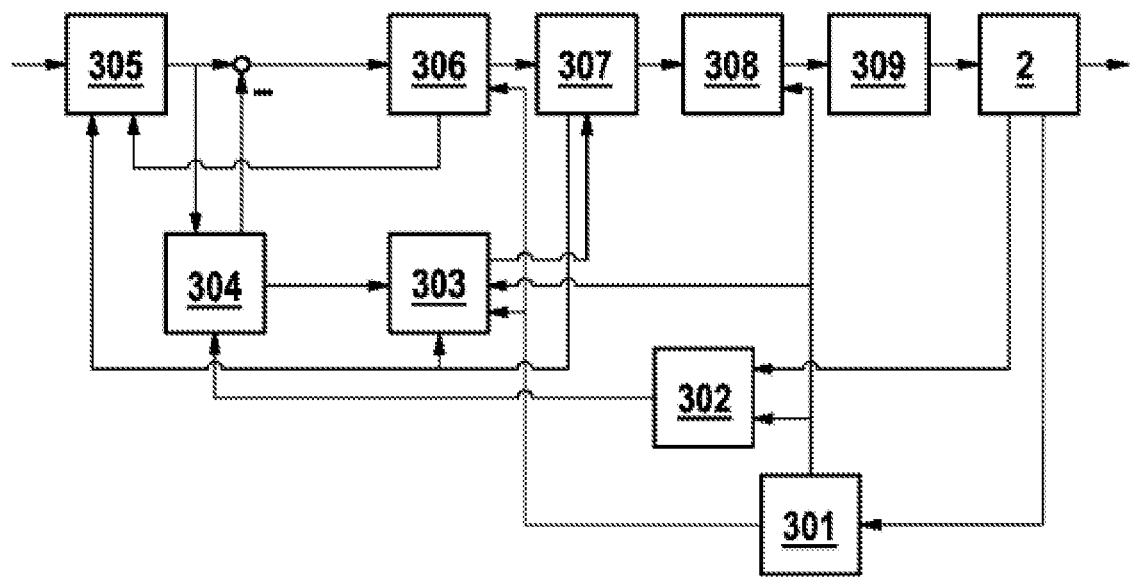
FIG. 2 a schematic diagram illustrating a method of operating an electric machine according to an embodiment of the invention.

FIG. 2 shows a schematic diagram explaining a method for operating an electric machine 2, in particular having a device 1 as described hereinabove.

A rotor angle $\varphi_{sens}$ is measured, which corresponds to a rotor position of a rotor of the electric machine 2. A calculation unit 302 uses the rotor angle $\varphi_{sens}$ to calculate a magnetic flux $\varphi_{flx}$, which is provided to an input transformer 302 and an output transformer 308, as well as a rotation rate w, which is provided to a current regulator 306.

Furthermore, a machine feedback variable Iabc (comprising a harmonic feedback variable) of the electric machine 2 is determined within the time range and transformed using the input transformer 302 into a feedback variable Idq in a field-oriented system, thereby taking into account the magnetic flux angle $\varphi_{flx}$. The feedback variable Idq is provided to a filter 304.

A means 305 determines a correcting variable Idq* on the basis of a torque manipulated variable $T_{EM}$*. The filter 304 generates a feedback variable without the portion of the primary wave $Idq_{WoFund}$, which is provided to a harmonic regulator 303, as well as a regulation feedback variable $Idq_{ctrl}$. The regulation feedback variable $Idq_{ctrl}$ is subtracted from the correcting variable Idq* to obtain a regulation deviation, which is supplied to the current regulator 306. Based on the regulation deviation and the rotation rate γ, the current regulator 306 calculates a primary wave equalizing variable $Udq_{Fund}$*, which is supplied to a variable means 307.

The harmonic regulator 303 generates a harmonic manipulated variable $Udq_{Hrmc}$* with respect to a portion of the harmonics (harmonic waves), which is also supplied to the variable means 307. The variable means 307 generates a variable $Udq_{Lim}$ by superimposing the primary wave equalizing variable $Udq_{Fund}$* and the harmonic manipulated variable $Udq_{Hrmc}$*. The manipulated variable $Udq_{Lim}$ is provided to the output transformer 308. The current regulator 306 outputs a portion of the fundamental wave uResvFunda, and the variable means 307 outputs a portion uResv$_{Hrmc}$ of the harmonics to the means 305.

The output transformer 308 generates a machine variable Uabc* within the time range based on the manipulated variable $Udq_{Lim}$ and taking into account the magnetic flux angle $\varphi_{flx}$. This variable is provided to an inverter 309, which generates a phase voltage Uabc used to energize at least one winding of the electric machine 2.

Figure 3:
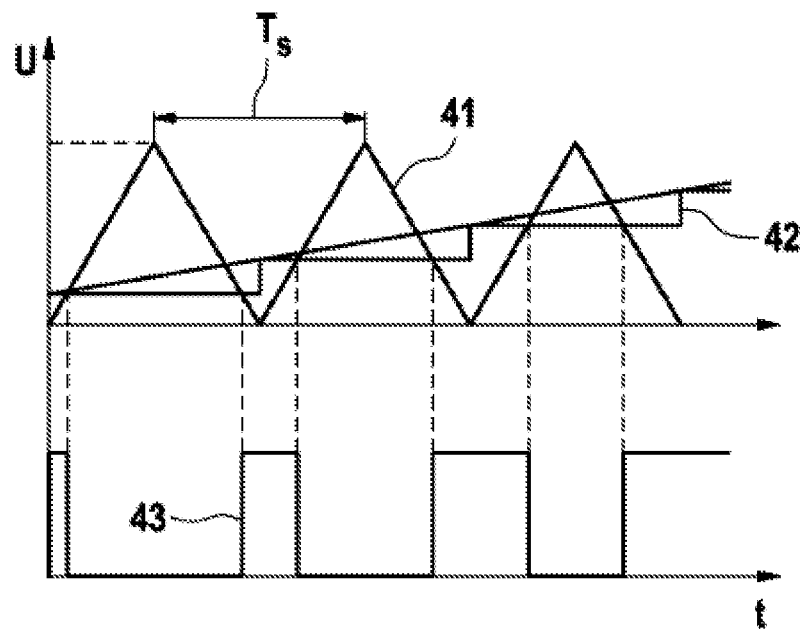
FIG. 3 a diagram explaining pulse width modulation using single-update.

FIG. 3 shows a diagram explaining single-update pulse width modulation, the voltage U being plotted as a function of time. Accordingly, for each pulse 43, i.e., for each period of the pulse width modulation method, switch-on and switch-off times (i.e., the increasing and falling flanks of the pulse 43) are determined based on intersections of a comparison voltage 41 (with a periodic duration $T_s$) and a raster calculator 42. The harmonic manipulated variable is therefore determined once per pulse.

Figure 4:
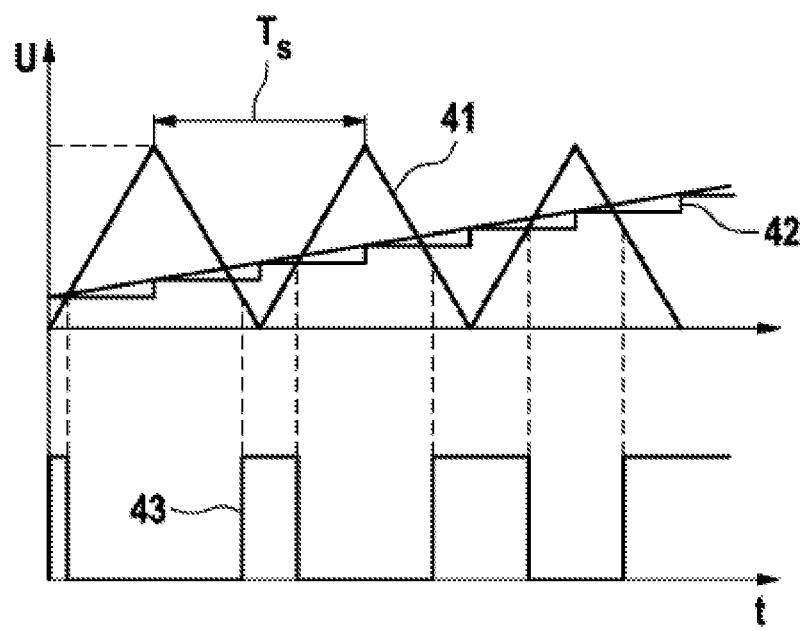
FIG. 4 a diagram explaining pulse width modulation using Double-Update.

FIG. 4 shows a diagram explaining double-update pulse width modulation. The raster calculator 42 is in this case selected such that the harmonic manipulated variable is determined for both the switch-on operation and the switch-off operation for each period of the pulse width modulation method.

Figure 5:
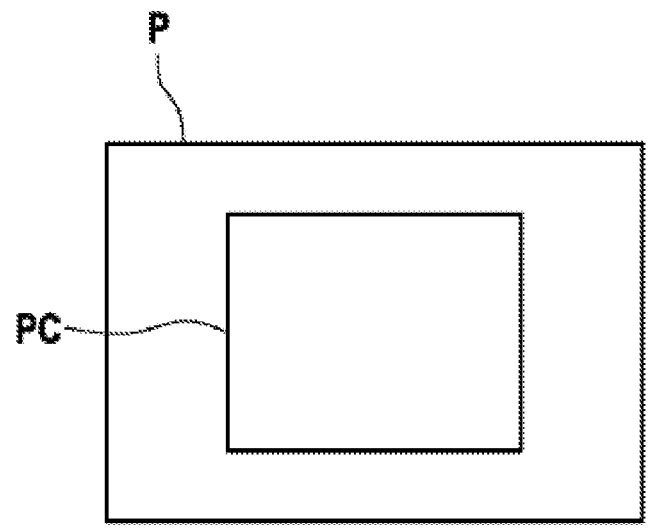
FIG. 5 a schematic block diagram of a computer program product according to one embodiment of the invention.

FIG. 5 shows a schematic block diagram of a computer program product P having an executable program code PC. The executable program code PC is designed to perform the method according to the invention when executed on a computer.

Figure 6:
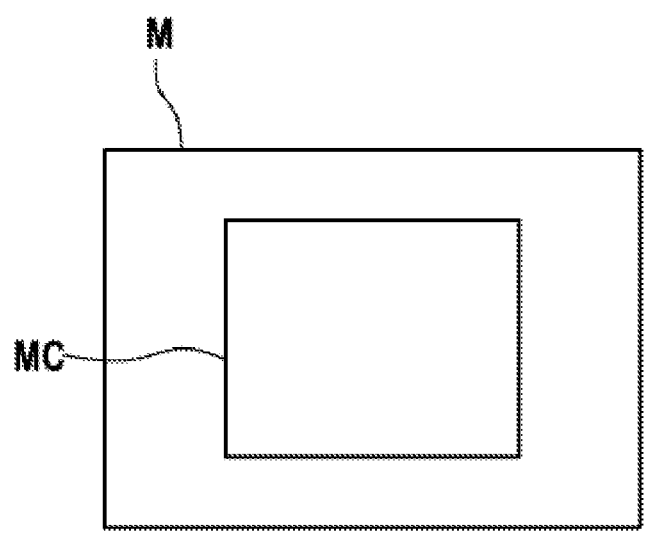
FIG. 6 a schematic block diagram of a non-volatile computer-readable memory medium according to one embodiment of the invention.

FIG. 6 shows a schematic block diagram of a non-volatile computer-readable memory medium M having an executable program code MC designed to perform the method according to the invention when executed on a computer.

The invention claimed is:

1. A method for operating an electric machine (2), comprising the following steps:
   determining a harmonic manipulated variable with respect to a harmonic of a predetermined frequency occurring during the energization of the electric machine (2); and
   energizing the electric machine (2) using the determined harmonic manipulated variable by means of a pulse width modulation method;
   wherein, for each period of the pulse width modulation method, the harmonic manipulated variable is determined for both a switch-on operation and a switch-off operation.

2. The method according to claim 1, further comprising the following steps:
   determining a harmonic feedback variable, which comprises an actual variable for the harmonics occurring during energization of the electric machine (2); and
   determining a harmonic regulation deviation using the determined harmonic feedback variable and a predetermined reference variable with respect to the harmonic,
   wherein the harmonic manipulated variable is determined using the determined harmonic regulation deviation.

3. The method according to claim 2,
   wherein the harmonic feedback variable comprises the actual variable for the harmonic in a field-oriented system;
   wherein the harmonic feedback variable is transformed into a harmonic correcting variable in a harmonic-oriented system; and
   wherein the harmonic regulation deviation is determined as a difference between the harmonic correcting variable and the predetermined reference variable.

4. The method according to claim 3, wherein, in order to determine the harmonic manipulated variable using the determined harmonic regulation deviation, a harmonic equalizing variable is determined in the harmonic-oriented system, and wherein the harmonic equalizing variable is reverse-transformed into the harmonic manipulated variable in the field-oriented system.

5. The method according to claim 1, wherein a primary wave manipulated variable is further determined by means of a primary wave regulation process, wherein a machine variable is determined by superimposing the primary wave manipulated variable on the harmonic manipulated variable, and wherein the electric machine (2) is energized using the determined machine manipulated variable.

6. A computer program product (P) comprising an executable program code (PC) designed to perform the method according to claim 1 when executed on a computing device.

7. A device (1) for operating an electric machine (2), comprising:
a computing means (11) designed to determine a harmonic manipulated variable with respect to a harmonic of a predetermined frequency occurring during the energization of the electric machine (2); and
a control means (12) designed to energize the electric machine (2) using the determined harmonic manipulated variable by means of a pulse width modulation method;
wherein the device (1) is designed to determine the harmonic manipulated variable for both a switch-on operation and a switch-off operation for each period of the pulse width modulation method.

8. The device (1) according to claim 7, wherein the computing means (11) is further designed to:
determine a harmonic feedback variable comprising an actual variable for the harmonics occurring during the energization of the electric machine (2);
determine a harmonic regulation deviation using the determined harmonic feedback variable and a predetermined reference variable with respect to the harmonic; and
determine the harmonic manipulated variable using the determined harmonic regulation deviation.

9. The device (1) according to claim 8, wherein the harmonic feedback variable comprises the actual variable for the harmonic in a field-oriented system; and
wherein the computing means (11) is further designed to:
transform the harmonic feedback variable into a harmonic equalizing variable in a harmonic-oriented system, and
determine the harmonic regulation deviation as a difference between the harmonic equalizing variable and the predetermined reference variable.

10. A non-volatile computer-readable memory medium (M) comprising instructions that when executed by a computer cause the control an electric machine (2) by:
determining a harmonic manipulated variable with respect to a harmonic of a predetermined frequency occurring during the energization of the electric machine (2); and
energizing the electric machine (2) using the determined harmonic manipulated variable by means of a pulse width modulation method;
wherein, for each period of the pulse width modulation method, the harmonic manipulated variable is determined for both a switch-on operation and a switch-off operation.

* * * * *